US009722908B2

(12) United States Patent
Chambliss et al.

(10) Patent No.: US 9,722,908 B2
(45) Date of Patent: *Aug. 1, 2017

(54) PROBLEM DETERMINATION IN A HYBRID ENVIRONMENT

(71) Applicant: International Business Machines Corporation, Armonk, NY (US)

(72) Inventors: David D. Chambliss, Morgan Hill, CA (US); Joshua W. Knight, Mohegan Lake, NY (US); Ronald K. Kreuzenstein, Sunnyvale, CA (US); John J. Lee, Scotts Valley, CA (US); James A. Ruddy, San Jose, CA (US); John G. Thompson, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/056,105

(22) Filed: Oct. 17, 2013

(65) Prior Publication Data

US 2015/0113116 A1    Apr. 23, 2015

(51) Int. Cl.
*G06F 15/173* (2006.01)
*G06F 17/30* (2006.01)
*H04L 12/26* (2006.01)
*G06F 11/07* (2006.01)

(52) U.S. Cl.
CPC ......... *H04L 43/50* (2013.01); *G06F 11/0721* (2013.01); *G06F 11/0778* (2013.01); *H04L 43/10* (2013.01)

(58) Field of Classification Search
CPC .............................. G06F 11/366; G06F 21/577
USPC ....................................................... 709/224
See application file for complete search history.

(56) References Cited

U.S. PATENT DOCUMENTS

| 4,847,754 | A | 7/1989 | Obermarck et al. |
| 5,319,782 | A | 6/1994 | Goldberg et al. |
| 5,850,426 | A | 12/1998 | Watkins et al. |
| 5,926,833 | A | 7/1999 | Rasoulian et al. |

(Continued)

FOREIGN PATENT DOCUMENTS

| WO | 2010089222 A1 | 8/2010 |
| WO | 2012158890 A1 | 11/2012 |

OTHER PUBLICATIONS

Combined Search and Examination Report under Sections 17 and 18(3) for GB Application No. GB1216252.5 mailed Jan. 8, 2013, 5 pgs.

(Continued)

*Primary Examiner* — Tonia L Dollinger
*Assistant Examiner* — Kishin G Belani
(74) *Attorney, Agent, or Firm* — Cantor Colburn LLP; William A. Kinnaman, Jr.

(57) ABSTRACT

A multi-mainframe system problem determination method includes recording, in a first computing system, diagnostic data, receiving, in the first computing system, a data collection trigger, responsive to the data collection trigger, coordinating, in the first computing system, synchronized collection of recorded diagnostic data with a second computing system and delivering collected diagnostic data to a storage medium.

4 Claims, 3 Drawing Sheets

(56) References Cited

U.S. PATENT DOCUMENTS

| | | |
|---|---|---|
| 6,173,360 B1 | 1/2001 | Beardsley et al. |
| 7,065,765 B2 | 6/2006 | Cadden et al. |
| 7,219,198 B2 | 5/2007 | Sivaram et al. |
| 7,444,667 B2 | 10/2008 | Bulusu et al. |
| 7,836,228 B1 | 11/2010 | Moir et al. |
| 7,839,875 B1 | 11/2010 | Masputra et al. |
| 7,882,202 B2 | 2/2011 | Alvarez et al. |
| 8,131,860 B1 | 3/2012 | Wong et al. |
| 8,161,330 B1 | 4/2012 | Vannatter et al. |
| 8,170,968 B2 | 5/2012 | Colclough et al. |
| 2001/0010053 A1 | 7/2001 | Ben-Shachar et al. |
| 2003/0208706 A1 | 11/2003 | Roddy et al. |
| 2004/0139142 A1 | 7/2004 | Arwe |
| 2004/0260852 A1 | 12/2004 | Olstad et al. |
| 2005/0030979 A1 | 2/2005 | Malloy |
| 2006/0047828 A1 | 3/2006 | Dearing et al. |
| 2006/0059228 A1 | 3/2006 | Kasamsetty et al. |
| 2007/0043861 A1 | 2/2007 | Baron |
| 2007/0150595 A1 | 6/2007 | Bhorania et al. |
| 2007/0162449 A1 | 7/2007 | Manolov et al. |
| 2008/0189352 A1 | 8/2008 | Mitchell et al. |
| 2008/0215767 A1 | 9/2008 | Nagami et al. |
| 2008/0313416 A1 | 12/2008 | Frondozo et al. |
| 2009/0070789 A1* | 3/2009 | Huscroft .............. G06F 1/3203 719/321 |
| 2009/0106741 A1* | 4/2009 | Dageville .......... G06F 11/3636 717/128 |
| 2009/0217103 A1 | 8/2009 | Borelli et al. |
| 2009/0222599 A1 | 9/2009 | Lehr et al. |
| 2010/0023521 A1 | 1/2010 | Arcese et al. |
| 2010/0228789 A1 | 9/2010 | Macedo |
| 2010/0275203 A1 | 10/2010 | Shinohara et al. |
| 2010/0287554 A1 | 11/2010 | Amundsen et al. |
| 2010/0306394 A1 | 12/2010 | Brown et al. |
| 2010/0313208 A1 | 12/2010 | Zarzycki et al. |
| 2010/0332776 A1 | 12/2010 | Uchikado et al. |
| 2011/0061093 A1 | 3/2011 | Korkus et al. |
| 2011/0099166 A1 | 4/2011 | Mugundan et al. |
| 2011/0208798 A1 | 8/2011 | Murrell et al. |
| 2011/0225373 A1 | 9/2011 | Ito et al. |
| 2011/0252173 A1 | 10/2011 | Armstrong et al. |
| 2012/0005763 A1 | 1/2012 | Stefik et al. |
| 2012/0030070 A1 | 2/2012 | Keller et al. |
| 2012/0096078 A1 | 4/2012 | Coates et al. |
| 2012/0151063 A1 | 6/2012 | Yang et al. |
| 2012/0174191 A1 | 7/2012 | Wood |
| 2012/0290576 A1* | 11/2012 | Amorim .............. G06F 21/577 707/737 |
| 2013/0054803 A1 | 2/2013 | Shepard et al. |
| 2013/0085985 A1 | 4/2013 | Maxfield |
| 2014/0068067 A1 | 3/2014 | Bansal |

OTHER PUBLICATIONS

Tero Hasu, "Implementing Jini Servers without Object Serialization Support", Autumn 2002, pp. 1-17. Located at http://www.tml.hut.fi/Studies/T-110.557/2002/papers/.

International Search Report and Written Opinion for International Application No. PCT/IB2012/055499 mailed Jan. 29, 2013, 6 pgs.

Gaitonde et al., "Model and Architecture for Diagnostic Requests in a Heterogeneous Distributed Environment", IP.com IPCOM000122033D, Apr. 4, 2005, pp. 1-7.

Disclosed Anonymously, "Avoidance of working storage stack data diagnostic information invalidation when handling an error condition or gathering First Failure Data Capture information", IP.com IPCOM00019489D, Apr. 12, 2010, pp. 1-4.

IBM; "ITCAM Agent for WebSphere Application: Configuring and using TTAPI"; IBM to=-ivoli Composite Application Manager for Application Diagnostics, Version 7.1.0.1; 2009-2010; 46 pgs.

Abstract of Japanese Publication No. JP2000322306A, Publication Date: Nov. 24, 2000; Applicant: Fujitsu Ltd, 1 pg.

Abstract of Japanese Publication No. JP2000311063A, Publication Date: Nov. 7, 2000 Applicant: Hitachi Ltd, 1 pg.

IBM; "ITCAM Agent for WebSphere Application: Configuring and using TTAPI"; IBM Tivoli Composite Application Manager for Application Diagnostics, Version 7.1.0.1; 2009-2010; 46 pgs.

Watson, "A Decade of OS Access-Control Extensibility", Feb. 1, 2013, Communications of ACM, pp. 52-63.

David D. Chambliss, et al., "Problem Determination in a Hybrid Environment," U.S. Appl. No. 14/501,151, filed Sep. 30, 2014.

List of IBM Patents or Patent Applications Treated as Related, (Appendix P), filed Mar. 29, 2016, 2 pages.

* cited by examiner

PROBLEM DETERMINATION IN A HYBRID ENVIRONMENT

BACKGROUND

The present invention relates to computing systems, and more specifically, to systems and methods for problem determination in multi-mainframe or hybrid computing environments.

In a typical multi-mainframe computing environment, a mainframe can include multiple servers, For example, the IBM® zEnterprise® system is a hybrid computing environment consisting of classic IBM® mainframe processors running the z/OS® operating system with closely attached commodity processors such as Intel® x86 or IBM® Power® processors which are running housed in one or more IBM® zBX BladeCenter® units and running the Linux® operating system. The zEnterprise® system also houses special versions of IBM® mainframe processors running a version of Linux® called zLinux. The coupling between z/OS® and the blades is accomplished by Ethernet networks using the Transmission Control Protocol/Internet Protocol (TCP/IP) protocol. If any data needs to be transferred from the mainframe to a blade, it must pass over this Ethernet network.

One intended exploiter of these commodity processors is an accelerator such as the IBM® DB2® Analytics Accelerator for query acceleration. Another intended exploiter is for hosting general purpose applications. The goal in most cases is to achieve greater economy in the cost of raw processing, without sacrificing the properties of comprehensive manageability offered in the mainframe environment. The processes on the blades should be experienced by the customer as integrated extensions to the mainframe functionality, not as independent systems with a separate burden of administration. When those processes are managed in this way they can be regarded as agents of the mainframe application(s).

Operation of an agent enabled mainframe includes deployment of software to the blade platform(s) through mainframe software facilities; issuing instructions from mainframe software to the agent, directing it to perform operations; delegating access rights to the agent, for data controlled by mainframe software, for the purpose of performing the directed operations; and the mainframe software receiving results of those operations by the agent. Presently, current systems lack efficient problem determination, and First Time Data Capture, in a system with agents.

SUMMARY

Exemplary embodiments include a multi-mainframe system problem determination method, including recording, in a first computing system, diagnostic data, receiving, in the first computing system, a data collection trigger, responsive to the data collection trigger, coordinating, in the first computing system, synchronized collection of recorded diagnostic data with a second computing system and delivering collected diagnostic data to a storage medium.

Further exemplary embodiments include a multi-mainframe computing system, including a first server module, a second server module communicatively coupled to the first server module, the second server module and a data storage medium accessible by the first server module and the second server module, wherein the first server module is configured to solve and identify problems within the multi-mainframe system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein provide a data collection facility on an agent-enabled mainframe system that enables component-spanning problems to be addressed.

In exemplary embodiments, the systems and methods described herein can be embodied in a modification and extension of existing diagnostics facilities. One example of such a facility is the trace facility in the AIX® operating system. The systems and methods described herein provide for efficient time-stamped recording of information from system components and user programs into trace buffers which can be extracted and recorded if necessary. The systems and methods described herein set up a tracing channel, incorporate tracing into components when the programs are built, start and stop tracing at run time, and extract and format trace data.

In exemplary embodiments, the systems and methods described herein can be invoked indirectly and directly by the system users or developers. Indirectly, the systems and methods described herein are invoked as part of the hybrid system management facility, so as to achieve the goals of unified management for the system.

Figure 1:
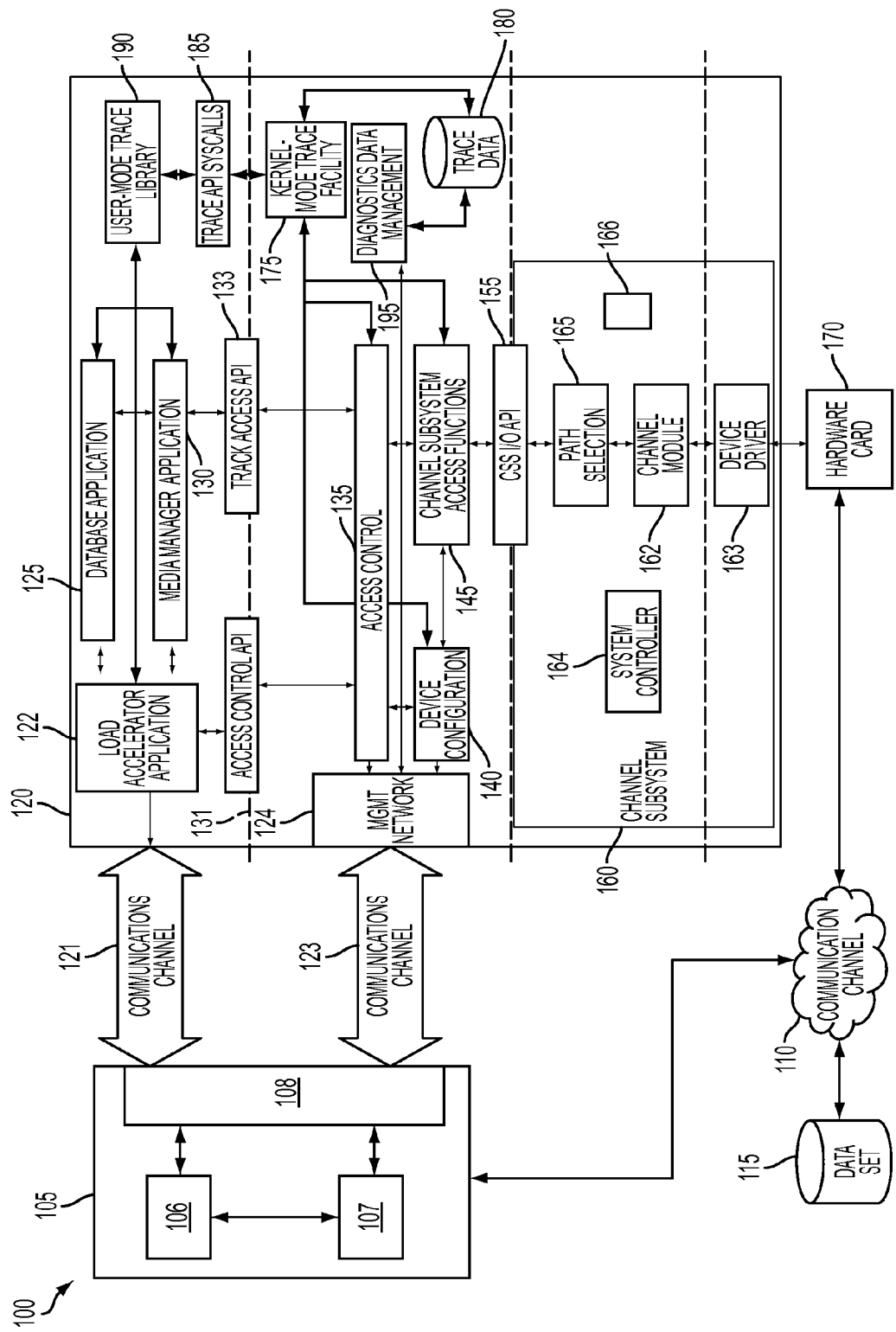
FIG. 1 illustrates an exemplary system in which problem determination in multi-mainframe or hybrid computing environments can be made.

FIG. 1 illustrates an exemplary system 100 in which problem determination in multi-mainframe or hybrid computing environments can be made. It will be appreciated that the system 100 is illustrative and that other exemplary systems are contemplated.

The system 100 can be part of a larger multi-mainframe system that may be part of a single logical system (e.g., a Parallel Sysplex® configuration), each of the mainframes having multiple server modules. For illustrative purposes, one server module (i.e., first server module 105) of a mainframe is illustrated. The server module 105 runs an operating system that can support multiple workloads (e.g., z/OS®). The server module 105 supports data access over a suitable communication channel 110 (e.g., Fibre Connection (FICON®)) to a data set 115. The operating system that supports multiple workloads (e.g., z/OS®) ensures that only authorized users are allowed to access the data set 115. The system 100 also includes a second server module 120 that runs an operating system (e.g., Linux) differing from the operating system running on the first server module 105. In the hybrid system 100, the operating system running on the second server module 120 does not have authorized access components. In exemplary embodiments, the systems and methods described herein provide authorized access for the second server module 120. In exemplary embodiments, cross access between the first and second server modules 105, 120 allows the systems and methods described herein to perform problem determination across the entire system 100.

It will be appreciated that several different hybrid applications are contemplated in exemplary embodiments. For illustrative purposes, the server module 105 includes a relational database application (i.e., a first application) 106 and a media management application (i.e., a second application) 107, which are both coupled to a load accelerator application 108 supported in the operating system that can support multiple workloads (e.g., z/OS®). Corresponding components on the second server module 120 provide the functionality for problem determination in the system 100 as further described herein.

In exemplary embodiments, the load accelerator application 108 includes a communications channel 121 with a load accelerator application 122 supported in the operating system (e.g., Linux) on the server module 120. The load accelerator application 108 also includes a communications channel 123 with a management network application 124 residing on the second server module 120. The second server module 120 includes a relational database application (i.e., a first companion application to the first application) 125 coupled to a media management application (i.e., a second companion application to the second application) 130, respectively similar to the relational database application 106 and the media management application 107 residing of the first server module 105. The relational database application 125 and the media management application 130 include similar functionality to that of the relational database application 106 and the media management application 107 such that the functions can be mirrored in the system 100. The server module 120 further includes an access control module 135 that polices requests and sets up permissions as described further herein. The access control module 135 is coupled to the load accelerator application 122 via an access control application programming interface (API) 131. The access control module 135 is also coupled to the media management application 130 via a track access API 133. The access control module 135 is further coupled to a device configuration module 140 and a channel subsystem access functions module 145, which is also coupled to the device configuration module 140. The channel subsystem access functions module 145 is also coupled to a channel subsystem (CSS) I/O API 155. The system 100 further includes a channel subsystem 160 coupled to the CSS I/O API 155. The channel subsystem 160 interfaces with a hardware card 170 that ultimately provides access to the suitable communication channel 110 and to the data set 115. The channel subsystem 160 includes a path selection module 165 coupled to the CSS I/O API 155, a channel module 162 coupled to the path selection module 165 and a device driver 163 coupled to the channel module 162 and the hardware card 170. The channel subsystem 160 further includes a system controller 164 that provides channel control functions, and a kernel module 166, which provides kernel functions.

In exemplary embodiments, the system 100 further includes components that enable problem determination in the system 100, as now described. In exemplary embodiments, the system 100 further includes a kernel-mode trace facility 175 coupled to the access control module 135. The kernel-mode trace facility 175 functions similarly to a conventional trace facility in AIX®, although in exemplary embodiments it can be extended for improved security support. The system 100 further includes a trace data database 180 coupled to the kernel-mode trace facility 175, representing in-memory and persistent forms of trace data as stored by the kernel-mode trace facility 175. The system 100 further includes a trace API syscalls module 185 coupled to the kernel-mode trace facility 175. The trace syscalls module 185 is the defined API used from user-mode code to invoke trace methods as further described herein. The system 100 further includes a user-mode trace library 190 coupled to the load accelerator application 122, and to the trace API syscalls module 185. The user-mode trace library 190 is code available to user-mode programs to make use of trace methods in a manner that conforms with the requirements of the system 100 as further described herein. The system 100 further includes a diagnostics data management module 195 coupled to the trace data database 170. The diagnostics data management module 195 is a privileged component that provides for the access to diagnostics data through the management network 124.

For illustrative purposes, a potential application for zBX blades is described as a context in which the systems and methods described herein can be implemented, and in which exemplary embodiments can be described. It will be appreciated that the example application for zBX blades is illustrative only and that other applications are contemplated. In the example, agents on one or more blade platforms perform Extract, Transform, Load (ETL) processing of data managed by a mainframe DB2® system (e.g., the relational database application 125). In the example, the second server module 120 (e.g., the blade platform) performs processing on data managed by the first server module 105. At the application level (upper), the first relational database application 106 on the first server module 105 (e.g., DB2® on z/OS®) instructs an agent (e.g., the relational database application 125 (DB2® Express-C)) to perform operations on its behalf on its data. The relational database application 106 invokes system-level software (e.g., the load accelerator application 108), to ensure the agent is ready and compatible and can be trusted, and to grant it access to the mainframe-owned data. In exemplary embodiments, the system 100 directly provides access to the data via the system network (e.g., the communication channel 110), so that the data need not flow through the mainframe to reach the agent for the relational database application 125.

Conventionally, it is difficult to present an integrated view of a system when run-time problems arise, for example, because of hardware problems at any level, or because of software defects in the adjuncts. As such, problem determination within a single component is already difficult. In the context of an agent operation, the failure of a step of a procedure in a mainframe application could result from a problem in mainframe application software, a problem in the software for deploying software to the blade platform, a problem in the software for issuing instructions, a problem in the software for delegating access rights, a problem in the agent, or a problem in the blade platform. It is frequently more difficult to localize the problem to one specific component than to identify the problem once localized. Furthermore, an error in the end result can be the consequence of deviations among components which can be identified as a problem only by examining them in combination.

For any system to be viable in the long term, there must be effective procedures to collect diagnostics data and deliver it to an engineering staff that can determine the cause and resolve the problem. Known solutions for problem determination on a single platform include: collecting core dumps (for one process or for the full system); preserving logs; recording detailed traces in circular buffers for high efficiency; collecting live dumps from running processes without terminating them; and associating the collected data with management information that gives context for offline problem determination. Procedures familiar to those of ordinary skill in the art can be used to attempt a problem determination using such data. These manual tools and procedures are enhanced by design principles such as First Time Data Capture, in which data collection actions are automatically invoked when error-checking code detects a trigger condition that is known to represent an abnormal state of the software. The bundle of data collection actions is selected so that it is highly likely that the root cause of the trigger can be determined offline from the collected data.

Automated diagnostic data collection, augmented when necessary with additional manual diagnostics steps, is a workable way to manage problem determination in a single-platform system. For a heterogeneous system having cooperating components on multiple platforms the difficulty increases tremendously. The known general solutions use the separate diagnostic facilities on each platform independently. These are unsatisfactory for a system with adjuncts for several reasons as now described.

Automated diagnostic data collection procedures executing separately on the mainframe platform and on the adjunct platform often fail to collect the required data for problems that span multiple components. For example, a trigger in one component only collects data at that component, even if the root cause that must be found resides only on a separate component. That root cause may not trigger any data collection on its component, so no data will be collected that allows the root cause to be found. This example is a failure of first time data collection.

Separate data collection yields uncorrelated diagnostics information on each component or platform. Before a problem instance can be solved, the separate data sets must be aligned so that related events on separate components can be identified. An error-free alignment of all events is often impossible and is costly in effort and elapsed time. Errors in that alignment can mean wrong diagnoses or an inability to find a solution.

Separate use of diagnostics on the blade platform violates the manageability posture required of the hybrid system. Use of separate diagnostics requires direct access to the blade platform by service personnel (or even the customer) in order to invoke data collection and to retrieve diagnostic data. This problem creates the separate burden of administration that is to be avoided.

Separate use of diagnostics on the blade platform can violate the security properties required of the hybrid system. The direct access to the blade platform described above bypasses the protections that should be applied through mainframe-homed control of data access rights and operational modes of the agent.

For the context of the particular application described above, establishing correct operation through the cooperation of many components is challenging, and identifying the source of problems is difficult. For example, it is possible that the first indication of a problem appears when DB2® on z/OS® detects that the results presented by its agent DB2® Express-C do not pass a validity check. The cause could be corruption of the source data in the SAN storage device, incorrect handling of the data in the various I/O path components, incorrect setup of access rights and address conversion, errors in DB2® Express-C, and the like.

As described herein, the exemplary problem determination systems and methods provide a data collection facility on an agent-enabled mainframe system that enables component-spanning problems to be addressed. In exemplary embodiments, the systems and methods described herein provide: 1) automated delivery of diagnostics data from the blade platform to the mainframe platform, within the security and manageability requirements of the combined system; 2) triggering of data collection on both the blade platform and in the mainframe software, by a trigger condition on either the agent or the mainframe software; 3) generation and incorporation of cross-platform alignment information into diagnostics data, whether recorded continually or event-triggered; and 4) incorporation of agent-operation-specific alignment information into diagnostics data.

In exemplary embodiments, the systems and methods described herein generate diagnostics data that enables problem determination for the agent-enabled mainframe as an integrated system, rather than as multiple components. The systems and methods described herein enable diagnostics data to be retrieved and consumed within the manageability and security requirements of the hybrid system. The systems and methods described herein make automated data collection effective since one trigger can invoke collection of all related data. The systems and methods described herein provide intrinsic alignment so that component-spanning problems can be examined without ambiguity.

Figure 2:
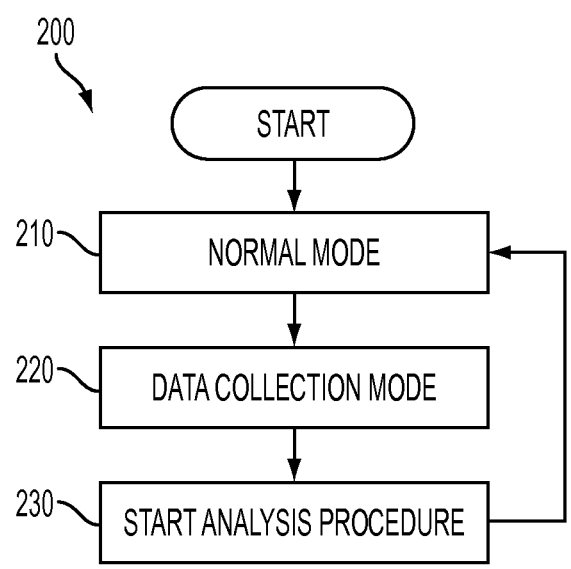
FIG. 2 illustrates an overall flowchart of a method for problem determination in multi-mainframe or hybrid computing environments in accordance with exemplary embodiments.

In exemplary embodiments, the systems and methods described herein can operate in stages, including, but not limited to: 1) normal operation; 2) data collection on trigger; and 3) analysis of collected data. As such, FIG. 2 illustrates an overall flowchart of a method 200 for problem determination in multi-mainframe or hybrid computing environments (such as the system 100 of FIG. 1) in accordance with exemplary embodiments. At block 210, the system runs in normal mode. At block 220, the system runs in data collection mode in which the first server module 105 records diagnostic data. As part of the data collection mode, the first server module 105 receives a data collection trigger. At block 230, the system 100 delivers data for analysis mode. In analysis mode the first server module 105 coordinates synchronized diagnostic data collection with the second server module 120. As part of the analysis mode, the first server module delivers the diagnostic data to a storage medium. As part of the analysis mode, the first server module also establishes a trace data channel to record the diagnostic data and a session identifier, and collects clock offset information for combining with trace data. Once the data collection trigger is received, the trace data associated with the session identifier is also received. In exemplary embodiments, the diagnostic data is filtered via the session identifier. In exemplary embodiments, the first server module is able to view a sequence of events across multiple components of the multi-mainframe system via the clock offset information to localize problems. Each of the blocks of FIG. 2 is now described in further detail.

In normal mode (at block 210 of FIG. 2), when setting up to invoke operations by the agent (i.e., the relational database application 125 (DB2® Express-C)), the mainframe application (i.e., the relational database application 106 (DB2®)) establishes a session identifier to be used for coordinated logging and tracing. The session identifier is established to associate data items recorded in the kernel-mode trace facility 175 and in the trace data database 180 with a particular processing activity performed at the mainframe application. It may be used during a different mode to group the data items associated with one activity and to separate them from data items associated with different activities. In exemplary embodiments, the session identifiers might be identified with specific SQL queries performed in the relational database application 106 or with specific subqueries within a top-level query. In exemplary embodiments, multi-tenancy might be supported on the server modules 105, 120. As such, different parties might be permitted to send commands independently for execution in the system 100, either by one agent or by separate agents. If so, the session identifier is constructed to ensure distinct identification of the different parties.

In exemplary embodiments, the load accelerator application 108 implements the management network 123 to instruct the diagnostics data management component 195 to set up a trace data channel and start trace collection on it. This is done in the context of setting up the operation of the agent (which here is the relational database application 125 (DB2® Express-C)), close to the time that the access control and track access APIs 131, 133 are set up to provide for data access. This setup is done before the access rights are set up. In this step, the load accelerator application 108 obtains or establishes the trace channel identifier and additional tagging information that should be used for this trace channel and for this instance of the agent's operation. For example, the tagging information could include the session identifier generated by the relational database application 125.

The load accelerator application 108 records the association of the trace channel identifier and additional tagging information with the session identifier in diagnostic data in the system 100.

The setup step might also include the establishment of clock offset information, by which the difference between event clocks on the blade platform and on z/OS® are measured. If so, that information is recorded on the first server module 105 (e.g., on z/OS®).

In exemplary embodiments, the load accelerator application 108 includes the trace channel identifier and additional tagging information in its messages to Access Control and other privileged components. Those components include the generation of trace records in their processing, and the trace records include the trace channel identifier and additional tagging information.

When the load accelerator application 108 prepares commands and operations for sending, it adds to the tagging information an operation instance identifier, which identifies one operation among many that might have been issued in a single session or in a time interval. The operation instance identifier might be the value of a wrapping counter of size one, two, or four bytes. When it sends commands and operations through the load accelerator application 122 to the relational database application 125 (e.g., DB2® Express-C) and to the media management application 130 (e.g., Media Manager Lite), it includes the channel identification and any tagging information which the receiving components will need for tracing. Those components invoke the user-mode trace library 190 to generate trace records during their processing steps. The trace records include the trace channel identifier and additional tagging information.

For efficient operation, the tagging information included in each trace record is kept compact, typically a single integer of length four or eight bytes, or a character string of comparable length. This length may be too small to contain every field of interest in its most natural format, but it is sufficient to contain key values which can be used to locate those fields of interest. For example, the session identifier generated by the relational database application 106 (e.g., DB2®) might be long enough to include strings that uniquely identify a z/OS instance and its start time, and a DB2® instance including its address space, and a user, and possibly other information. That content could be associated to a short index value (which might eventually be reused), the association of the index value with the long-format session identifier could be recorded in a trace record, and only the index value would be included in run-time trace records.

In exemplary embodiments, when multi-tenancy is supported, the tagging information is used to make security-related decisions. The trace facility 175 might additionally validate the tagging information to prevent agents from using incorrect tagging field values.

In normal mode (at block 210 of FIG. 2), if operations all complete successfully, some or all of the diagnostic data associated with those operations becomes subject to discard so that its space can be reused. For example, the trace data recorded in the kernel-mode trace facility 175 for a particular trace channel may end up being discarded by being overwritten when the trace buffer wraps. In exemplary embodiments the mainframe application signals the expiration of a trace channel when the activity associated with that trace channel has completed successfully, and the expiration makes the associated trace data eligible for discard. However, if an error is detected during operation, by any of the components that are involved in this coordinated processing, a data collection trigger may be created. The trigger creation could happen in the detecting component, or the decision to generate a trigger could be centralized at one component such as the relational database application 106. The relational database application 106 may associate the trigger with one session identifier, with several session identifiers, or with all currently active session identifiers. The association with session identifiers depends on the nature of the error and how it is detected.

As a result of the data collection trigger, the system transitions into data collection mode (at block 220 of FIG. 2). In this mode, the load accelerator application 108 communicates with diagnostics data management module 195 to preserve and retrieve the trace data associated with the session identifier or identifiers associated with the trigger. Preserving the trace data means protecting in-memory and on-disk trace data from discard or overwrite until it has been retrieved as described below. In exemplary embodiments, the system in data collection mode continues performing the actions and operations described above for normal mode, and additionally performs the preservation and retrieval of trace data. The operations associated with the session identifier or identifiers associated with the trigger may be aborted, suspended, or continued. The operations associated with any session identifiers not associated with the trigger may be suspended or continued. The operations which are continued may do so in a modified or constrained manner to allow the preservation and retrieval of trace data. The diagnostics data management module 195 invokes methods of the kernel-mode trace facility 175 as needed to collect in-memory trace data into disk files. In exemplary embodiments, the diagnostics data management module 195 may invoke facilities to convert the trace data to a formatted layout. In addition, the diagnostics data management module 195 retrieves the file data and communicates it to z/OS® over the management network. In retrieving the data the diagnostics data management module 195 might filter the data to include only the data associated with the session identifier with which the trigger is associated, or to include only data for session identifiers associated with the same security principal. The inclusion of a filtering step depends on the possibility of multi-tenancy and on security requirements. If one blade platform only conducts operation for one session identifier at a time, or only for multiple session identifiers associated with the same security principal, then filtering might be unnecessary. In exemplary embodiments, delivery of the trace data can be performed by writing the data into a file directory established in z/OS® in the setup process and making the data available to the blade platform as a mount point using NFS services.

As a result of the data collection trigger, the load accelerator application 108 stores any in-memory diagnostic data it contains, and any relational database diagnostic data associated with the same session identifier, onto persistent storage associated with the data received from the blade platform. In exemplary embodiments, the data can be written into the same file directory to be used by the blade platform for delivery of its diagnostic data.

In exemplary embodiments, the various components (such as the agent DB2® Express-C) will also be notified of the trigger, and given the opportunity to save additional diagnostic information, either through the trace facility or in separate files accessible by the diagnostics data management module 195.

In exemplary embodiments, more than one agent and more than one blade platform are involved in the same operation, and deliver their data to one z/OS®.

In exemplary embodiments, diagnostic data will be saved spontaneously in the blade platform. For example if the relational database application 125 process crashes, it will generally create a core dump file. The diagnostics data management module 195 will include such data in the data delivered to z/OS®.

Upon completion of the data collection process, the system starts (at block 230 of FIG. 2) the analysis procedure on the collected data, described below. After starting the analysis procedure the system proceeds to normal mode and resumes the operations described for it. Any operations which were performed in a modified or constrained manner during data collection mode are performed without those modifications or constraints. The analysis procedure consists of the operations described below, and may be performed while the system continues in normal mode. In the analysis procedure, the data collected at z/OS® from the blade platform(s) and from z/OS® components is made available to engineering staff in a merged view. The merged view allows users to examine events from components on multiple platforms as a single body, for example as a unified time sequence of events recorded for a single operation instance or for a single time sequence. The merged view is not one particular rendering, and it is desirable that a system would offer flexible rendering options such as sorting, filtering, highlighting, summarization, and simultaneous display of multiple windows.

Because of the correlated recording of events using tagging information, and possibly the correction of timing offsets using clock offset information, the actual sequence of events across multiple components can be viewed, and problems can be localized, identified, and solved more quickly.

Some processing steps of the collected data will be specific to the example described herein, but will be evident to one of ordinary skill in the art. For example, as described here, trace records are most likely kept compact at run time by using key values in place of long-format identifiers. Analysis tooling will be able to render records in an expanded form ("denormalized" in database terms) by collecting the records associating keys with long-format values, and replacing keys in records with some or all of the expanded content.

Analysis is done with support for security requirements. In exemplary embodiments, the trace records can contain private data of the session it is associated with. Many different users might make use of the same hybrid system (e.g., the system 100), and it is typically unacceptable for each to have full access to the data of the others. A full presentation of diagnostic data with no filtering might expose sensitive personal information or other protected data unacceptably. The tagging data attached to trace records provides context information from which the security attributes of that data can be derived.

The operation of the invention has been described above with reference to the response to a single data collection trigger. In some embodiments, the data collection mode is conducted such that the creation of a second data collection trigger is not possible while in data collection mode, for example because all activity that may create such a trigger is aborted or suspended. In other embodiments, it is possible for the system to create a second data collection trigger while in data collection mode. In embodiments where this is possible the system might respond to the second trigger with a separate data collection activity or it might cause the existing data collection activity to be modified to enable problem determination for both first and second triggers. It will be evident to one of skill in the art that such variations are in the scope of the claimed invention.

Figure 3:
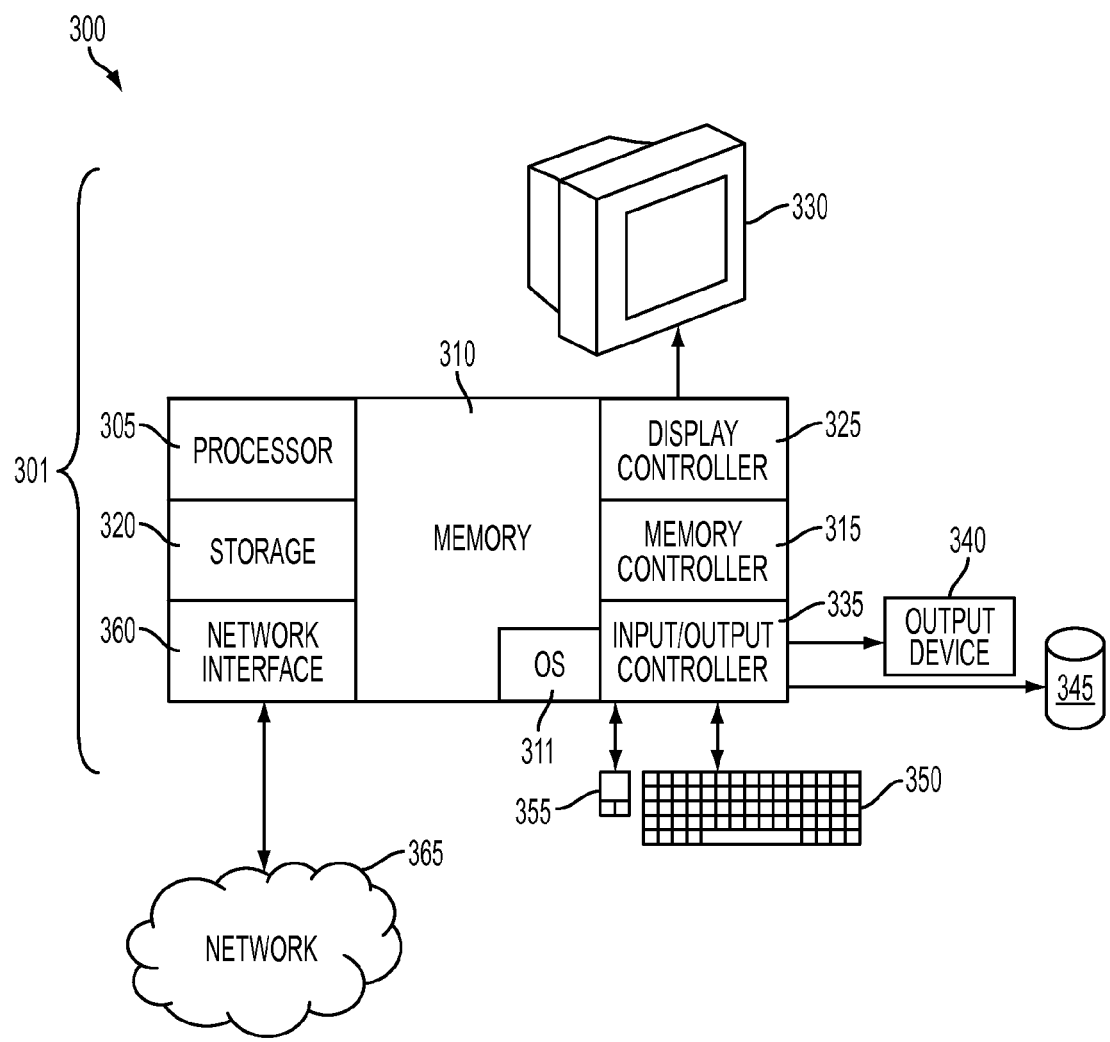
FIG. 3 illustrates an exemplary embodiment of a system that can be implemented for problem determination in multi-mainframe or hybrid computing environments.

The first and second server modules 105, 120 can be any suitable computing system as now described. FIG. 3 illustrates an exemplary embodiment of a system 300 that can be implemented for problem determination in multi-mainframe or hybrid computing environments. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the problem determination methods described herein in accordance with exemplary embodiments and a suitable operating system (OS) 311. The OS 311 essentially controls the execution of other computer programs, such the problem determination systems and methods as described herein, and provides scheduling, input-output control, file and data management, memory management, and communication control and related services.

The problem determination methods described herein may be in the form of a source program, executable program (object code), script, or any other entity comprising a set of instructions to be performed. When it is a source program, then the program needs to be translated via a compiler, assembler, interpreter, or the like, which may or may not be included within the memory 310, so as to operate properly in connection with the OS 311. Furthermore, the problem determination methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The problem determination methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the problem determination methods are implemented in hardware, the problem determination methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A multi-mainframe computing system, comprising:

a first server module running a first operating system;

a second server module communicatively coupled to the first server module, the second server module running a second operating system differing from the first operating system running on the first server module; and a data storage medium accessible by the first server module and the second server module, wherein the first server module is configured to solve and identify problems within the multi-mainframe system, and wherein the first server module is configured to:

receive, in the first server module, a data collection trigger;

responsive to the data collection trigger, provide authorized access via an agent to the second server module, and coordinate, in the first server module, synchronized diagnostic data collection with the second server module;

establish a trace data channel to collect the diagnostic data;

establish a session identifier; and filter the diagnostic data using the session identifier.

2. The system as claimed in claim 1 wherein the first server module is configured to:

record, in the first server module, the diagnostic data; and deliver the diagnostic data to the data storage medium.

3. The system as claimed in claim 2 wherein the first server module is further configured to:

in response to the trigger, retrieve the trace data associated with the session identifier.

4. The system as claimed in claim 1 wherein the diagnostic data is at least one of trace records, log records and core dumps.

* * * * *